A. H. McKITRICK.
Hay Elevator and Unloader.

No. 202,450. Patented April 16, 1878.

Witnesses;

Inventor;
Alexander H. McKitrick
Per A. H. Byers, Atty.

UNITED STATES PATENT OFFICE.

ALEXANDER H. McKITRICK, OF TIFFIN, OHIO, ASSIGNOR OF ONE-HALF HIS RIGHT TO GEORGE DICKEY.

IMPROVEMENT IN HAY ELEVATORS AND UNLOADERS.

Specification forming part of Letters Patent No. 202,450, dated April 16, 1878; application filed October 19, 1877.

*To all whom it may concern:*

Be it known that I, ALEXANDER H. McKITRICK, of Tiffin, in the county of Seneca and State of Ohio, have invented a new and useful Improvement for Unloading or Pitching Hay, which improvement is fully set forth in the following specification, reference being had to the accompanying drawings.

Figure 1:
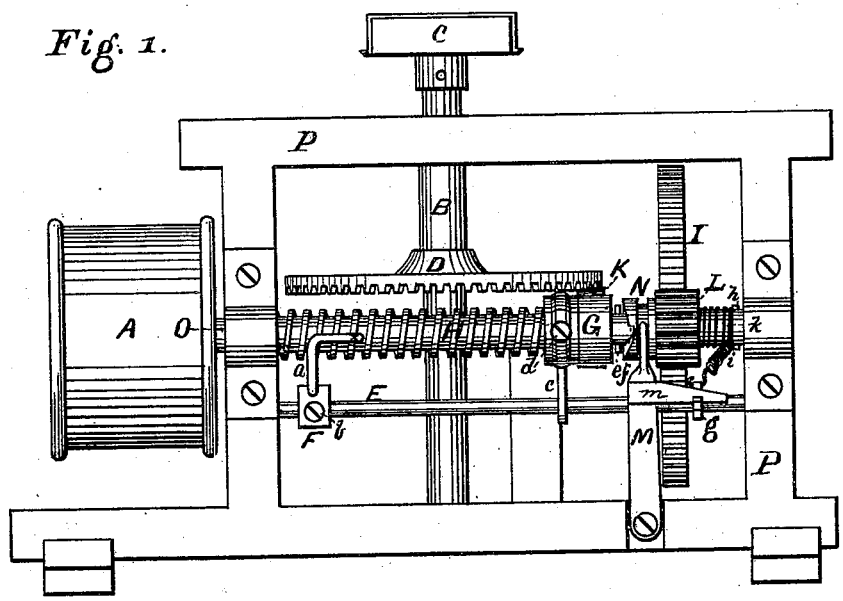
Figure 2:
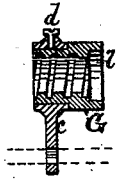
Figure 3:
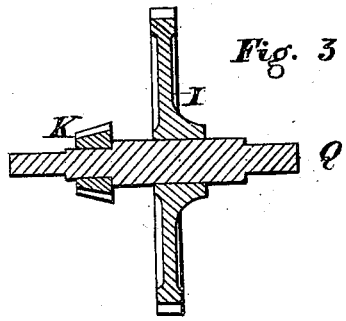

Figure 1 is a side view of my machine. Fig. 2 is a sectional view of the collar G. Fig. 3 is a sectional view, showing the shaft Q and wheels K and I.

The letter P represents the frame upon which the machine is mounted, and may be made in any shape or form desired. B is the main or upright shaft, and works in boxes secured to said frame P, and to which the motive power is applied. The main or bevel wheel D is mounted on shaft B, the cogs of which work in the cogs of the bevel-wheel K, which is mounted upon shaft Q, which works in boxes secured to the side of frame P. On the same shaft is mounted wheel I, the cogs of which mesh in the cogs of wheel L, which plays loosely on shaft O. This shaft has its bearings in boxes secured to the uprights of frame P. The pin $h$ passes through shaft O near its end. One end of the spiral spring $k$ is firmly secured to this pin, the other end of which bears against the side of wheel L. The hub of this wheel extends outward on the opposite side, and has a groove, N, and outside of this groove it has clutches $f$. These clutches are on opposite sides of the hub, and at opposite points, equidistant therefrom, the hub extends beyond the clutch, and bevels down toward the clutch. At this point another pin passes through shaft O. This shaft has a screw, H, cut on it, as shown in Fig. 1. The collar G has a thread cut on the inside, so as to work on the screw H. On one end of collar G there is another collar, which fits snugly over it, and is held in position by the set-screw $d$. This outer collar has an arm, $c$, projecting. This arm has a hole in its end, which slips over the rod E. The collar G has a rim or flange, $l$, projecting outward, so as to allow the collar G to move toward the wheel L until the rim or flange on collar G presses against hub of wheel L without causing the clutches $f$ to catch the pin $e$.

The block F is made to slide over the rod E, and is held in any desired position by the set-screw $b$. To block F is attached the crooked arm $a$, as shown in Fig. 1. The arm $g$ is firmly secured to the rod E. A spiral spring, $i$, is attached by one end to frame P, the other end of which is secured to the arm $g$. The lower end of the forked arm M is pivoted to the frame P, the upper or forked end of which fits snugly in the groove N, as shown in Fig. 1. To this arm M is attached a cross-arm, $m$, which has a notch in its under side. A is a spool or reel, upon which the rope is wound in raising the fork from the wagon to the mow.

The operation of my machine is as follows: The frame P is staked down the same as any other horse-power, the rope attached to the fork, secured to the reel A and passed over the pulley, which is secured to the roof over the mow to be filled, and down to the position where it is to be unloaded, the machine having been previously turned forward until the collar G has forced the wheel L back so as to cause the arm $g$ to spring into the notch in arm $m$. This will allow the reel A to revolve backward. The fork will now be drawn back to the wagon so as to leave sufficient slack rope for the convenience of loading the fork. The block F is now adjusted on the rod E so as to hold the crooked arm $a$ just in rear of the collar G. The fork is now loaded, and the horse started. The operator now draws down the rope attached to the fork until collar G presses down the arm $a$, and forces the arm $g$ out of the notch in arm $m$; the spiral spring $k$ will press the clutches $f$ on wheel L against the pin $e$. This will cause the reel A to revolve and draw the loaded fork to the mow. When it reaches the desired position the collar G will force wheel L back, disengaging the clutches $f$ from the pin $e$, thus throwing the machine out of gear, and allow the fork to drop without stopping the horse. The fork is drawn back and again loaded, the rope drawn down so as to throw the machine into gear again, as above described. By this means much time is saved, as the horse walks steadily on, while with the methods now in use the horse moves back and forth, losing much time in stopping and starting. This power may be used for any other purpose by unscrewing the set-screw $d$, which will allow collar to revolve continuously without throwing the machine out of gear.

I claim as my invention—

1. The wheel L, with groove N and beveled clutches $f$, operated by the spiral spring $k$, substantially as and for the purpose set forth.

2. The collar G, with the arm $c$, in combination with shaft O, screw H, and the rod E, substantially as and for the purpose set forth.

3. The block F, crooked arm $a$, rod E, arm $g$, and spiral spring $i$, in combination with arms M and $m$, substantially as and for the purpose set forth.

4. The wheel L, with groove N, beveled clutches $f$, pin $e$, shaft O, screw H, collar G, crooked arm $a$, arms M and $m$, spiral spring $i$, in combination with wheels D, I, and K, and shafts B and Q, substantially as and for the purpose set forth.

ALEXANDER H. McKITRICK.

Witnesses:
JNO. A. STONER,
J. S. BYERS.